March 31, 1931. A. H. CANDEE 1,799,085
GEAR CUTTING MACHINE
Filed Nov. 29, 1929 3 Sheets-Sheet 2

INVENTOR
Allan H. Candee
BY
his ATTORNEY

March 31, 1931.  A. H. CANDEE  1,799,085
GEAR CUTTING MACHINE
Filed Nov. 29, 1929    3 Sheets-Sheet 3

INVENTOR
Allan H. Candee
BY
his ATTORNEY

Patented Mar. 31, 1931

1,799,085

UNITED STATES PATENT OFFICE

ALLAN H. CANDEE, OF ROCHESTER, NEW YORK, ASSIGNOR TO GLEASON WORKS, OF ROCHESTER, NEW YORK, A CORPORATION OF NEW YORK

GEAR-CUTTING MACHINE

Application filed November 29, 1929. Serial No. 410,457.

The present invention relates to machines for producing gears and particularly to machines in which the cutting tool is driven by a crank and in which the work is rotated continuously at a uniform velocity to produce in combination with the tool motion the lengthwise shape of the teeth and index the blank between successive cutting strokes of the tool.

As is well known and as is pointed out in Patent No. 1,616,439 of February 8, 1927, when a planing tool is reciprocated by means of a crank across the face of a continuously rotating gear blank, due to the varying velocity of the tool under actuation of the crank, a curved slot is cut in the blank which is of double curvature and of general S-shape.

Such a form of lengthwise tooth curve is undersirable in gears not only because of the lack of adjustment which mating S-curve gears would have in mesh but also because the clearance angle between the side of the tool and the tooth surface being cut varies appreciably across the face of the blank so as oftentimes to cause chatter and produce a poor finish on the tooth surface. As pointed out in Patent No. 1,616,439 above referred to, the cutting difficulties can be overcome and a tooth of unidirectional lengthwise curvature obtained by producing between the crank driven tool and the uniformly rotating blank an additional motion at a varying velocity.

The purpose of the present invention is to provide a simplified form of machine operating according to the principles of the patent already referred to and in which the tool crank is itself driven at a varying velocity and by a pair of eccentric gears. In such a machine, the tool motion under actuation of the eccentric gear driven crank will be substantially uniform throughout the cutting portion of the stroke.

In the accompanying drawings there is illustrated a preferred embodiment of the present invention.

Figure 1:
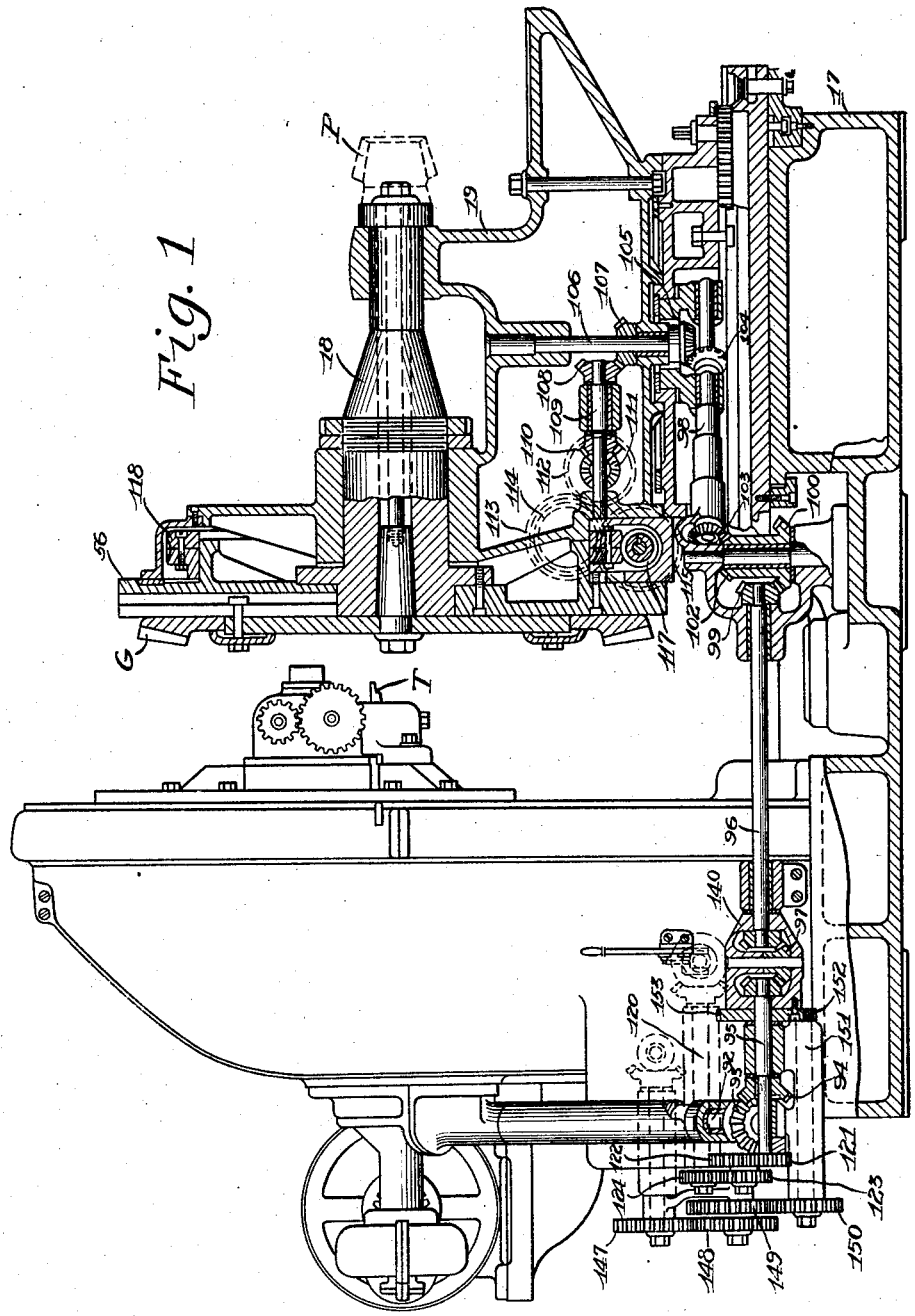
Figure 1 is a side elevation partly in section of a machine embodying the preferred construction.

The present invention will be described in connection with a machine for generating bevel gears. It will be understood, however, that this invention is applicable to the production of other types of gears also, whether generated or non-generated.

In the drawings, the cutting tool is indicated at T. This tool may be of any suitable form and is adjustably mounted upon a tool head 10 which is adjustably secured to the tool slide 11. The tool slide 11 is mounted for reciprocation in guide ways 12 formed in an arm 13 that is angularly adjustable on the cradle 14 about an axis offset from the cradle axis.

The cradle 14 is rotatably mounted in bearings 15 and 16 formed in the base or frame 17 of the machine.

The structure of the cradle, tool head and slide forms no part of the present invention. For a more detailed description of the structure illustrated in the drawings, reference may be had to the patent already mentioned.

The gear blank to be cut is secured to one or the other end of the work spindle 18, depending upon whether the work piece is a gear blank or a pinion blank. The work spindle 18 is journaled in a work head 19. The drawings show in full lines a gear blank G secured to one end of the work spindle 18 and in dotted lines how a pinion blank P might be secured to the other end thereof. The work head 19 is reversible end for end to bring either end of the work spindle into cutting relation with the tool. This construction of work head forms no part of the present invention and is described fully in Patent No. 1,732,633 of October 22, 1929.

During the operation of the machine illustrated, the reciprocating motion is imparted to the tool and a continuous rotary motion at a uniform velocity is imparted to the work spindle. In addition, when the tooth profiles are being generated, a simultaneous slow rotary movement is imparted to the cradle.

The reciprocation of the tool is produced by rotation of the crank 20 which is connected to the tool slide 11 by the connecting rod 21, one end of which is connected with the tool slide by means of the pin 22 and the other end of which is connected with the crank plate by means of the adjustable crank pin 23. The crank plate 20 is itself formed integral with the shaft 24 which is journaled in a suitable bearing in the cradle 14.

A tool moving under actuation of a uniformly rotating crank travels at a varying velocity. If such a tool is moving across the face of a continuously rotating gear blank, it will cut a groove of S-shape lengthwise in the blank unless the crank motion is modified. In the present invention, the crank motion is modified by driving the crank through a pair of eccentric gears. These gears produce in themselves a motion at a varying velocity in the member which is driven by said gears. When this motion at a varying velocity is combined in the proper relation with the crank motion, the tool may be made to travel at a substantially uniform velocity and cut a substantially uni-directional curve across the face of the blank. The eccentric gears may be simple spur gears, that is, gears having cylindrical top, pitch, and root surfaces, mounted eccentrically, or elliptical gears of known form, or, preferably, gears cut according to the process described in my copending application, Serial No. 415,422, filed December 20, 1929. By driving the crank from eccentric or elliptical gears, it is possible to retain in a machine of the continuous indexing type, the simplicity of a crank drive for the tool and at the same time secure a substantially uniform tool velocity across the face of the gear blank.

In the machine illustrated, the crank is driven from the motor 28, which is mounted upon a suitable bracket secured to the frame of the machine, through the speed change gears 29 and 30, the shaft 31, the bevel gears 32 and 33, the shaft 34 which is journaled coaxially of the cradle, the spur pinion 35 which is secured to the shaft 34 and the spur gear 36 which is secured to a shaft 37 that is journaled in suitable bearings in the cradle in parallel relation to the shaft 34. Secured to the shaft 37 at its inner end is a gear 38 which meshes with and drives a spur gear 39 which is secured to the inner end of a shaft 40 which is journaled in the cradle 14 in axial alignment with the shaft 34 and in parallelism with the shaft 37. Secured to the gear 39 for rotation therewith is a spur gear 42 which meshes with and drives a spur gear 43 which is adjustably secured to the crank plate 20 by means of T-bolts 44 which are secured in the crank disc and the heads of which engage in the circular slot 45 formed in the gear 43. It will be noted that the gears 38 and 39 are each mounted eccentrically of their respective shafts 37 and 40. If these are involute spur gears they will run together smoothly despite change in center distance so that though eccentrically mounted they will nonetheless drive one another continuously and due to their eccentric mounting will impart to the driving gear 42 a motion at a varying velocity. The same result can be obtained by employing elliptical gears of known form or by employing, as is preferred, gears cut according to the process of the application above referred to. Since the gear 42 rotates at a varying velocity under actuation of the gears 38 and 39, it will drive the gear 43 and the crank connected to the gear 43 at a varying velocity. The gears 38 and 39 will preferably be provided with equal numbers of teeth.

Through the gearing just described, therefore, the crank is driven continuously at a varying velocity and the tool slide 11 receives, therefore, a motion which is a resultant of two elements, each of which in itself would produce normally a motion at a varying velocity. When these two elements are properly combined, then, the tool may be driven at a substantially uniform velocity, cutting, therefore, a groove in the blank which extends substantially in one direction with a tool clearance angle which remains substantially constant throughout the length of the cut. The best results can be obtained by selecting the gears 42 and 43 so that they will provide a reduction at an integral ratio between the gear 39 and the crank disc. In the illustrated embodiment, the reduction between the eccentric gears and the crank disc is a 1:2 reduction, that is, the eccentric gear 39 rotates twice for each revolution of the crank disc.

By a suitable construction, such as is described in Patent No. 1,616,439 above mentioned, the tool arm 13 can be adjusted on the cradle 14 to offset the path of the tool as desired for cutting gears having teeth of different spiral angles. The work support 19 can be adjusted for the cone distance of the blank to be cut and to bring the blank into the proper tangential relation with the tool by any suitable means, such as described in Patent No. 1,732,633 referred to above.

Figure 2:
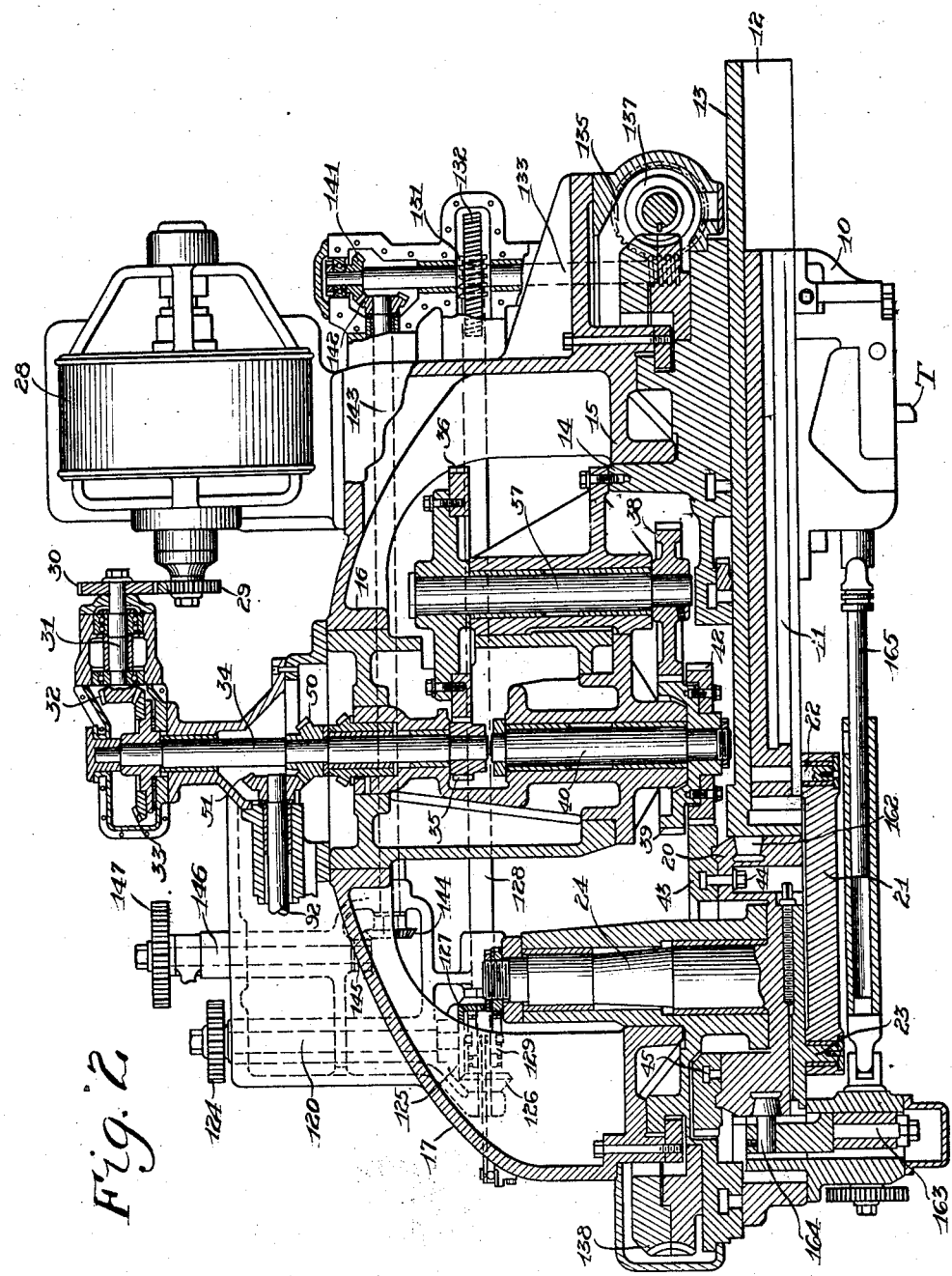
Figure 2 is a sectional plan view of the tool mechanism and cradle of this machine.
Figure 3:
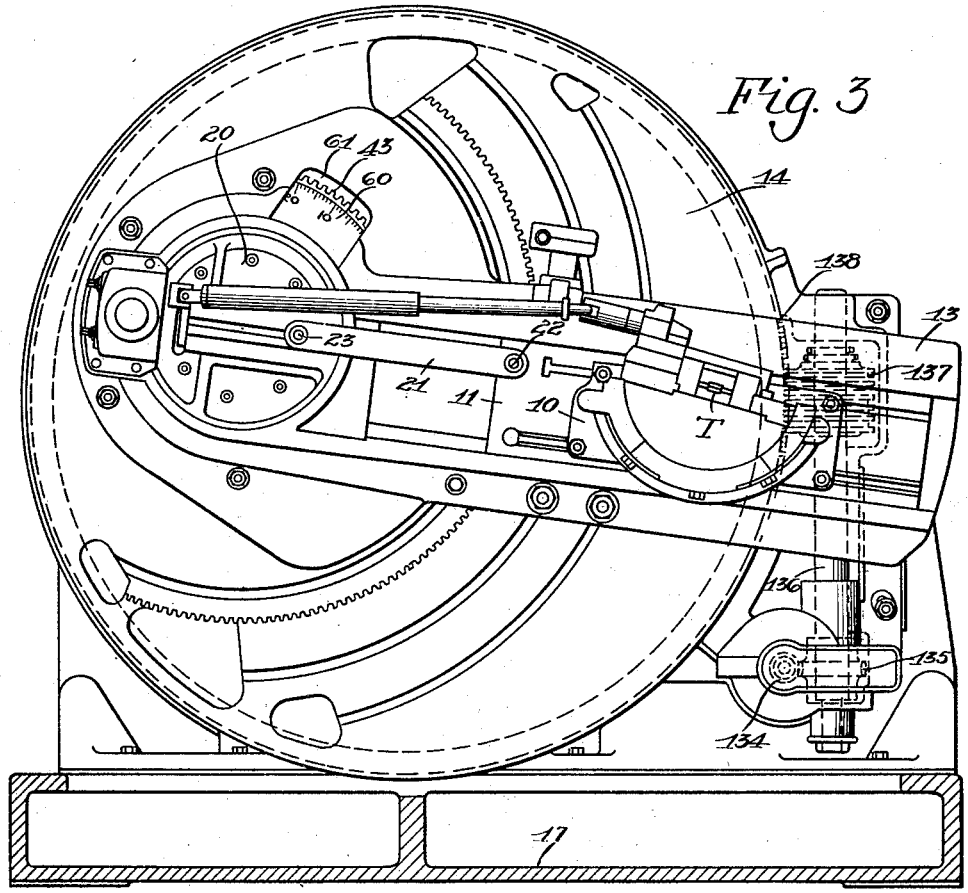
Figure 3 is a front elevation of the cradle and tool slide.
Figure 4:
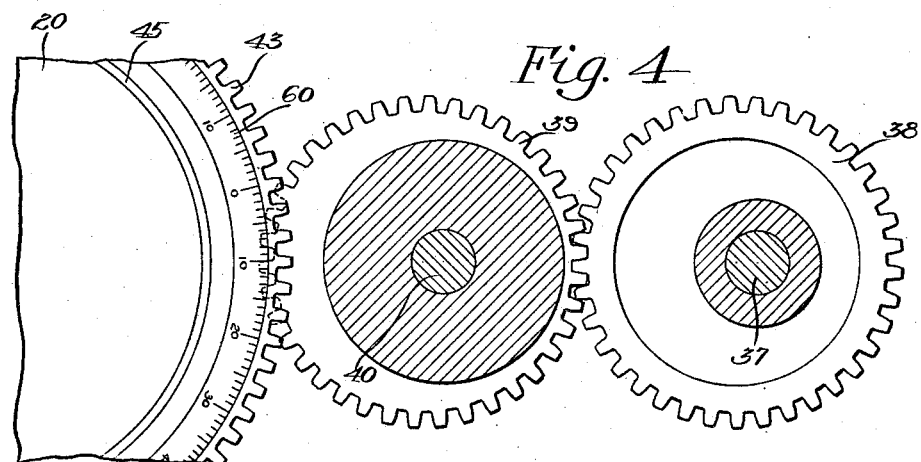
Figure 4 is a view showing a detail of the tool drive and in particular the eccentric gears.

The means for driving the blank continuously at a uniform velocity may, also, be of any suitable nature. In the machine illustrated in the drawings, the same drive is employed as in the machine of Patent No. 1,732,633 and may be briefly described here. This drive comprises the bevel gear 50 (Fig. 2) which is secured to the shaft 34, the bevel gear 51 driven thereby, the shaft 92, the bevel gears 93 and 94, the shaft 95, the differential gears 97, the shaft 96, the bevel gears 99 and 100, the bevel gears 102 and 103, the telescoping shaft 98, the bevel gears 104 and 105, the shaft 106, the bevel gears 107 and 108, the shaft 109, the bevel gears 110 and 111, the index change gears 112, 113, 114 and 115, the worm 117, and the worm wheel 118 which is secured to the face plate 56 which is in turn secured to the work spindle 18.

When the gears are to be generated, the cradle is preferably driven continuously at a uniform velocity. Again, this mechanism forms no part of the present invention and may be such as described in Patent No. 1,732,633 above mentioned. Thus, the cradle may be driven from the shaft 92 (Figs. 1 and 2) through the bevel gears 93 and 94 and the shaft 95 already referred to. The shaft 95 drives a parallel shaft 120 through the feed change gears 121, 122, 123 and 124, the last named being secured to the shaft 120. The shaft 120 is operatively connected with the shaft 128 either through the bevel gear 125 and the bevel gear 126 or through the bevel gear 125 and the bevel gear 127 by means of a reversing clutch 129. The shaft 128 carries a worm 131 which meshes with a worm wheel 132 on a shaft 133 and the shaft 133 carries in turn a worm 134 which meshes with a worm wheel 135 on a shaft 136. The shaft 136 has secured to it a worm 137 which meshes with and drives the worm wheel 138 that is secured to the cradle 14.

For maintaining the correct relation between the tool and work despite the rotation of the cradle, an additional rotational movement is imparted to the work spindle by rotation of the differential housing 140. This additional rotational movement is derived from the shaft 133 through the bevel gears 141 and 142, the shaft 143, the bevel gears 144 and 145, the shaft 146, the ratio change gears 147, 148, 149 and 150, the shaft 151, and the gears 152 and 153, the last named gear being secured to the differential housing 140.

The tool preferably cuts on its stroke in one direction and is clapped or lifted out of cutting position on its stroke in the opposite direction. The clapping mechanism forms no part of the present invention and may be of any suitable character. It may be actuated from the cam 162 which is formed integral with the crank disc 20, the cam roller 164, the rod 163 and the telescoping shaft 165 as described in Patent No. 1,732,633 above mentioned.

With the present machine, bevel gears having longitudinally curved teeth may be cut. It is usually advisable to cut the teeth of mating spiral bevel gears with slightly different lengthwise curvatures so that such gears may adjust themselves readily to the differences in mounting and changing loads which occur in practice. The difference in lengthwise teeth curvature or mismatch can be readily obtained with a machine constructed according to the present invention by adjusting the crank disc 20 angularly with reference to the eccentric gears 38 and 39 so that the crank disc will have a slightly different angular relation to the eccentric gear 39 when cutting one member of the pair from that which it has when cutting the other member of the pair. This adjustment can be effected quickly by loosening up on the bolts 44 and rotating the gear 43 the desired amount with reference to the crank disc 20 and then securing the gear 43 to the crank disc again by tightening up on the bolts 44. To assist the operator in effecting this adjustment, the gear 43 may be graduated on its front face as indicated at 60 and an opening or window 61 cut into the face of the cradle to permit these graduations to be seen. A suitable index mark may be provided at the wall of this opening to enable the graduations to be read. The effect of the angular adjustment of the gear 43 with reference to the crank disc 20 is to vary slightly the relation of occurrence of the phases of the varying motion produced by the gears 38 and 39 with reference to the phases of the varying motion produced by the crank 20 and so cut a slightly different form of lengthwise curve on the blank. When the described adjustment is made it is necessary to readjust the tool into cutting relation with the side of the tooth. This is done by the tool adjusting means always provided in a machine of the type described.

While the invention has been described in connection with a machine for cutting gears in a continuous indexing process, it will be understood that the idea of using a pair of eccentrically mounted spur gears to drive a crank to obtain a uniform motion may have other uses and that there is no intention, therefore, to restrict the invention to use in the type of machine described. It will be understood, also, that the invention may be employed in the cutting of spur, helical, herringbone, and hypoid gears as well as bevel gears.

In general, it may be said that while the invention has been described in connection with a specific structure that the invention is capable of various further modifications and uses and that this application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, a tool slide having a tool mounted thereon and means for imparting a reciprocatory motion to said slide comprising a crank having an operative connection with said slide and a pair of eccentrically mounted spur gears driving said crank, said gears being so arranged with reference to the crank that they drive the crank with a variable motion which modifies the variable motion normally produced by the crank in such manner that the tool slide travels at a substantially uniform velocity during the cut.

2. In a machine for producing gears, a tool slide having a tool mounted thereon, and means for imparting a reciprocatory motion to said slide comprising a crank having an operative connection with said slide, a pair of eccentrically mounted spur gears, and gearing driving said crank from said eccentrically mounted gears, said gearing being so selected that the driven member of the pair of eccentrically mounted gears makes a plurality of revolutions for each revolution of the crank and said eccentrically mounted gears and gearing being so arranged relative to the crank that the crank is driven with a variable velocity which modifies the variable motion normally produced by the crank in such manner that the tool slide travels at a substantially uniform velocity during the cut.

3. In a machine for producing gears, a work support, means for imparting a continuous indexing rotation to said work support, a tool slide having a tool mounted thereon, and means for imparting a reciprocatory motion to said slide comprising a crank having an operative connection with said slide and a pair of meshing eccentric gears driving said crank, said eccentric gears being so arranged with reference to the crank that they drive the crank at a variable velocity which modifies the variable motion normally produced by the crank in such manner that the tool slide travels at a substantially uniform velocity during the cut.

4. In a machine for producing gears, a work support, means for imparting a continuous indexing rotation to the work support, a tool slide having a tool mounted thereon, and means for imparting a reciprocatory motion to said slide comprising a crank having an operative connection with said slide and a pair of eccentrically mounted spur gears driving said crank, said eccentrically mounted gears being so arranged with reference to the crank that they drive the crank at a variable velocity which modifies the variable motion normally produced by the crank in such manner that the tool slide travels at a substantially uniform velocity during the cut.

5. In a machine for producing gears, a work support, means for imparting a continuous indexing rotation to the work support, a tool slide having a tool mounted thereon, and means for imparting a reciprocatory motion to said slide comprising a crank having an operative connection with said slide and a pair of eccentric gears driving said crank, said eccentric gears having an adjustable connection with said crank permitting the crank to be adjusted angularly about its axis relative to the positions which the gears occupy at any point of their rotational movement whereby the variable motion normally produced by the crank may be modified to any desired extent by the variable motion produced by the eccentric gears.

6. In a machine for producing gears, a work support, means for imparting a continuous indexing rotation to the work support, a tool slide having a tool mounted thereon, and means for imparting a reciprocatory motion to said slide comprising a crank having an operative connection with said slide, a pair of eccentric gears, and gearing driving said crank from said eccentric gears at a speed such that the driven member of the pair of eccentric gears makes a plurality of revolutions for each revolution of the crank, said eccentric gears and gearing being so arranged and selected that the crank is driven at a variable velocity which modifies the variable motion normally produced by the crank in such manner that the tool slide travels at a substantially uniform velocity during the cut.

7. In a machine for producing gears, a work support, means for imparting a continuous indexing rotation to the work support, a tool slide having a tool mounted thereon, and means for reciprocating said tool slide comprising a crank having an operative connection with said slide, and a pair of equal eccentric gears driving said crank, said gears being so arranged with reference to the crank that they drive the crank at a variable velocity which modifies the variable motion normally produced by the crank in such manner that the tool slide travels at a substantially uniform velocity during the cut.

8. In a machine for producing gears, a work support, means for imparting a continuous indexing rotation to the work support, a tool slide having a tool mounted thereon, and means for imparting a reciprocatory motion to said slide comprising a crank having an operative connection with said slide, a pair of equal eccentric gears, and gearing driving said crank from said eccentric gears at a velocity such that the driven member of the pair of eccentric gears makes a plurality of revolutions for each revolution of the crank, an adjustable connection being provided between said eccentric gears and the crank whereby the angular position of the crank with reference to the positions of the eccentric gears at any point of their rotation may be varied to permit the variable motion normally produced by the crank to be modified to any desired extent by the variable motion produced by the eccentric gears.

9. In a machine for producing gears, a work support, means for imparting a continuous indexing rotation to the work support, a tool slide having a tool mounted thereon, and means for imparting a reciprocatory motion to said slide comprising a crank having an operative connection with said slide, a pair of eccentric gears, and gearing connecting said eccentric gears with said crank, one member of said gearing being mounted coaxially with said crank and being connected thereto for adjustment angularly about their common axis whereby the variable motion normally produced by the crank may be modified to any desired extent by the variable motion produced by the eccentric gears.

ALLAN H. CANDEE.